(12) United States Patent
Uemura

(10) Patent No.: US 12,091,593 B2
(45) Date of Patent: Sep. 17, 2024

(54) TAPE

(71) Applicant: King Package Co., Ltd., Saitama (JP)

(72) Inventor: Sei Uemura, Saitama (JP)

(73) Assignee: King Package Co., LTD, Saitama (JP)

( * ) Notice: Subject to any disclaimer, the term of this patent is extended or adjusted under 35 U.S.C. 154(b) by 0 days.

(21) Appl. No.: 17/784,924

(22) PCT Filed: Feb. 24, 2021

(86) PCT No.: PCT/JP2021/006771
§ 371 (c)(1),
(2) Date: Jun. 13, 2022

(87) PCT Pub. No.: WO2021/172321
PCT Pub. Date: Sep. 2, 2021

(65) Prior Publication Data
US 2023/0010195 A1 Jan. 12, 2023

(30) Foreign Application Priority Data
Feb. 28, 2020 (JP) .................................. 2020-033243

(51) Int. Cl.
*B32B 3/24* (2006.01)
*B32B 3/26* (2006.01)
(Continued)

(52) U.S. Cl.
CPC .............. *C09J 7/203* (2018.01); *B32B 3/266* (2013.01); *B32B 7/12* (2013.01); *B32B 2255/26* (2013.01);
(Continued)

(58) Field of Classification Search
CPC ..................... Y10T 428/24314; B32B 3/266
See application file for complete search history.

(56) References Cited

U.S. PATENT DOCUMENTS

| | | | |
|---|---|---|---|
| 2007/0184242 A1* | 8/2007 | Rodewald | B32B 7/12 428/354 |
| 2008/0173389 A1 | 7/2008 | Mehta et al. | |

(Continued)

FOREIGN PATENT DOCUMENTS

| | | |
|---|---|---|
| EP | 3992261 A1 | 5/2022 |
| JP | 4325679 B | 11/1968 |

(Continued)

OTHER PUBLICATIONS

International Search Report for International Application No. PCT/JP2021/006771, mailed May 18, 2021, 6 pages.

(Continued)

*Primary Examiner* — William P Watkins, III
(74) *Attorney, Agent, or Firm* — TraskBritt

(57) ABSTRACT

A tape having an elongated shape includes a strength-reducing portion, a strength-maintaining portion, a and an opening prevention portion. The strength-reducing portion includes a first slit row and a second slit row parallel to the first slit row. Each slit row includes a plurality of slits and a plurality of non-slit portions that are portions in which the slits are not formed. The plurality of non-slit portions belonging to the first slit row and the plurality of non-slit portions belonging to the second slit row do not overlap each other in a transverse direction of the tape. The opening prevention portion closes ends of the plurality of slits. The strength-reducing portion and the strength-maintaining portion are aligned in the transverse direction of the tape.

5 Claims, 5 Drawing Sheets

(51) Int. Cl.
    *B32B 7/12*     (2006.01)
    *C09J 7/20*     (2018.01)
(52) U.S. Cl.
    CPC ............... *Y10T 428/24273* (2015.01); *Y10T 428/24314* (2015.01); *Y10T 428/24331* (2015.01)

(56) References Cited

U.S. PATENT DOCUMENTS

2009/0038754 A1*  2/2009  Rodewald ............... C09J 7/22
                                                     156/60
2014/0203018 A1   7/2014  Kerep

FOREIGN PATENT DOCUMENTS

| JP | 48-074725 U    | 9/1973  |
| JP | 2001-354923 A  | 12/2001 |
| JP | 2005-513194 A  | 5/2005  |
| JP | 2007-226449 A  | 9/2007  |
| JP | 2008-189865 A  | 8/2008  |
| JP | 2009-030057 A  | 2/2009  |
| JP | 2011-111163 A  | 6/2011  |
| JP | 2014-532090 A  | 12/2014 |
| JP | 2019-104835 A  | 6/2019  |
| JP | 6661816 B      | 3/2020  |
| WO | 2003/052018 A1 | 6/2003  |
| WO | 2020/261709 A1 | 12/2020 |

OTHER PUBLICATIONS

European Extended Search Report and Opinion for European Application No. 21759989.3, dated Nov. 7, 2023, 6 pages.

* cited by examiner

TAPE

CROSS-REFERENCE TO RELATED APPLICATIONS

This application is a national phase entry under 35 U.S.C. § 371 of International Patent Application PCT/JP2021/006771, filed Feb. 24, 2021, designating the United States of America and published as International Patent Publication WO 2021/172321 A1 on Sep. 2, 2021, which claims the benefit under Article 8 of the Patent Cooperation Treaty to Japanese Patent Application Serial No. 2020-033243, filed Feb. 28, 2020.

TECHNICAL FIELD

The present disclosure relates to a tape.

BACKGROUND

So far, various tapes have been commercialized, and one type is a reinforced tape with increased tensile strength. A typical example of a reinforced tape is a filament tape. A filament tape is a tape in which a polyester film having excellent wear resistance is reinforced with high-strength fibers. Also, published Japanese Translation No. 2005-513194 of the PCT International Publication discloses a reinforced tape having a transparent backing layer.

BRIEF SUMMARY

The reinforced tape described above is often used in a state in which a tensile load is applied in a longitudinal direction. In such a state, if a cut is generated at a side edge under the influence of strength reduction, friction, or the like, the cut may develop in a transverse direction due to the tensile load applied in the longitudinal direction, and there is a likelihood that the tape will be cut off.

The present disclosure has been made in view of the above circumstances, and an objective of the present disclosure is to provide a tape that is not easily cut even when a side edge is scratched.

In order to solve the above-described problem, a tape according to one aspect of the present disclosure is a tape, having an elongated shape including a first surface, a second surface on a side opposite to the first surface, a strength-reducing portion provided on at least one of the first surface and the second surface, a strength-maintaining portion positioned at a portion different from that of the strength-reducing portion and having a higher strength than the strength-reducing portion, and an opening prevention portion provided on at least one of the first surface and the second surface, in which the strength-reducing portion includes a first slit row having a plurality of first slits intermittently formed at intervals in a longitudinal direction of the tape and a plurality of first non-slit portions which are portions in which the first slits are not formed, and a second slit row parallel to the first slot row, the second slit low that has a plurality of second slits intermittently formed at intervals in the longitudinal direction of the tape and a plurality of second non-slit portions which are portions in which the second slits are not formed, the plurality of first slits and the plurality of second slits are disposed not to overlap each of the plurality of first non-slit portions and each of the plurality of second non-slit portions each other in a transverse direction of the tape, the opening prevention portion closes ends of the plurality of first slits and ends of the plurality of second slits in a thickness direction of the tape, and the strength-reducing portion and the strength-maintaining portion are aligned in the transverse direction of the tape.

The tape according to one aspect of the present disclosure may further include a long main base material extending in the longitudinal direction of the tape, and a sub base material laminated on at least one surface of the main base material, in which the strength-reducing portion may be formed in the main base material, and the opening prevention portion may be formed on the sub base material.

In the tape according to one aspect of the present disclosure, the main base material and the sub base material may be laminated together by a heat sealing agent or an adhesive.

The tape according to one aspect of the present disclosure may further include a long main base material extending in the longitudinal direction of the tape, and a resin applied to at least one surface of the main base material, in which the strength-reducing portion may be formed in the main base material, and the opening prevention portion may contain the resin.

The tape according to one aspect of the present disclosure may further include a long main base material extending in the longitudinal direction of the tape, in which the strength-reducing portion may be formed in the main base material, and the opening prevention portion may include a portion in which ends of the plurality of first slits and ends of the plurality of second slits of the tape in the thickness direction are welded.

According to the above aspect of the present disclosure, it is possible to provide a tape that is not easily cut even when a side edge is scratched.

DETAILED DESCRIPTION

Hereinafter, a tape according to an embodiment of the present disclosure will be described in detail with reference to the drawings. Further, the present disclosure is not limited to the following embodiments.

First Embodiment

Figure 1:
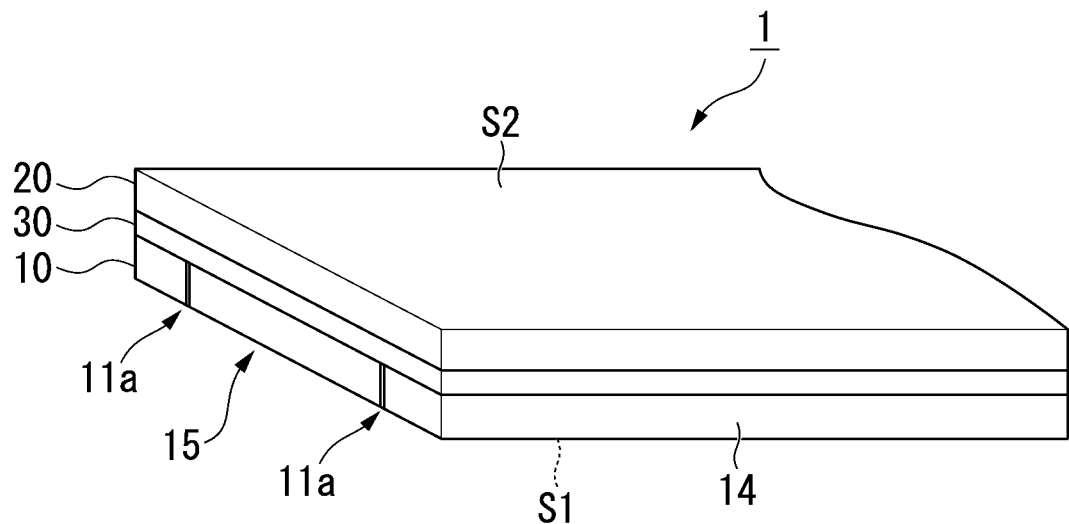
FIG. 1 is a perspective view illustrating a part of a tape according to a first embodiment.

FIG. 1 is a perspective view illustrating a part of a tape according to a first embodiment of the present disclosure. As illustrated in FIG. 1, a tape 1 of the present embodiment is a long tape including a first surface S1 and a second surface S2 on a side opposite to the first surface S1. A base film 10 (main base material) is provided on the first surface S1. A sub film 20 (an opening prevention portion, a sub base material) is provided on the second surface S2. The base film 10 and the sub film 20 are laminated together by a heat-sealing agent 30. The tape 1 has flexibility.

Figure 2:
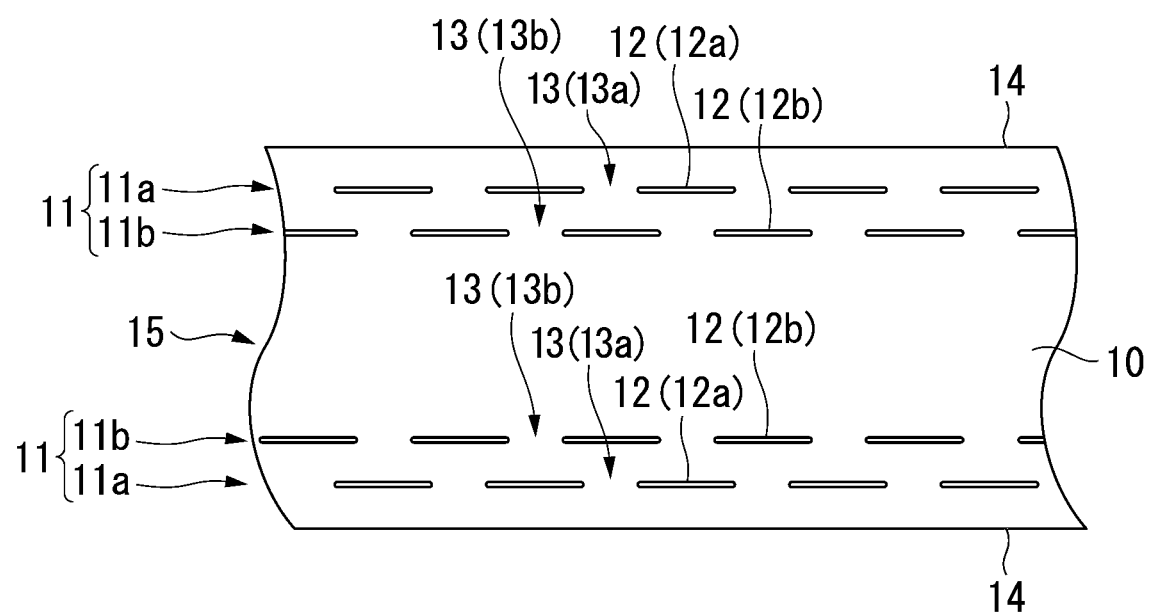
FIG. 2 is a plan view of a base film included in the tape according to the first embodiment.

FIG. 2 is a plan view of the base film 10 included in the tape according to the first embodiment of the present disclosure.

As illustrated in FIG. 2, the base film 10 is a long member having a constant width and extending along the tape 1. The base film 10 includes a strength-reducing portion 11 and a strength-maintaining portion 15 having a higher strength than the strength-reducing portion 11. In other words, the strength-reducing portion 11 and the strength-maintaining portion 15 are provided on the first surface S1. The strength-reducing portion 11 extends in a longitudinal direction of the base film 10. The strength-maintaining portion 15 extends in the longitudinal direction of the base film 10. The strength-reducing portion 11 and the strength-maintaining portion 15 are aligned in a transverse direction of the base film 10. In the present embodiment, two strength-reducing portions 11 are formed in the vicinity of both side edges 14 of the base film 10. Further, a plurality of strength-reducing portions 11 may not be formed, and at least one may be formed. Also, the strength-reducing portion 11 may not be formed in the vicinity of the side edge 14. The strength-reducing portion 11 reduces a strength of the tape 1 in the longitudinal direction, and makes it difficult for a cut to develop in the transverse direction of the tape 1.

The strength-reducing portions 11 each have two slit rows 11a and 11b (slit lines).

The slit rows 11a (first slit rows) are provided at positions separated from both side edges 14 by a predetermined distance in the transverse direction of the tape 1. The slit rows 11a are, for example, each formed at a position about 2 mm away from an adjacent side edge 14. Similarly, the slit rows 11b (second slit rows) are provided at positions separated from both side edges 14 by a predetermined distance in the transverse direction of the tape 1. The slit rows 11b, for example, are each formed at a position about 3 mm away from an adjacent side edge 14. That is, a total of four slit rows including two slit rows 11a formed on an outer side and two slit rows 11b formed on an inner side are formed in the tape 1 when viewed in the transverse direction.

Each slit row 11a includes a plurality of slits 12a (first slits) intermittently formed in the longitudinal direction of the tape 1 and non-slit portions 13a (first non-slit portions), which are portions in which the first slits 12a are not formed. Each slit row 11a forms a broken line in which the first slits 12a and the non-slit portions 13a are alternately disposed in the longitudinal direction in a plan view of the tape 1. Each slit row 11b includes a plurality of slits 12b (second slits) intermittently formed in the longitudinal direction of the tape 1 and non-slit portions 13b (second non-slit portions), which are portions in which the second slits 12b are not formed. The slit rows 11b are parallel to the slit rows 11a. Each slit row 11b forms a broken line in which the second slits 12b and the non-slit portions 13b are alternately disposed in the longitudinal direction in a plan view of the tape 1. Further, dimensions of the plurality of first and second slits 12a and 12b in the longitudinal direction may or may not be constant with each other. Similarly, dimensions of the plurality of non-slit portions 13a and 13b in the longitudinal direction may or may not be constant with each other. The first and second slits 12a and 12b are formed to penetrate from one surface to the other surface of the base film 10.

Further, the plurality of non-slit portions 13a and the plurality of non-slit portions 13b are disposed not to overlap each other in the transverse direction of the tape 1. In other words, the first slit 12a and the second slit 12b adjacent to each other in the transverse direction of the tape 1 are disposed so that ends thereof overlap each other in the transverse direction of the tape 1. That is, in the slit rows 11a and 11b, the first slits 12a and the second slits 12b are disposed to be shifted from each other by half a phase. Here, "shifted by half a phase" means that, in the longitudinal direction of the tape 1, one phase of a first pattern in which the non-slit portions 13a and the first slits 12a are repeated and one phase of a second pattern in which the non-slit portions 13b and the second slits 12b are repeated are out of phase with each other by half a phase. In other words, the first slits 12a and the second slits 12b are disposed in a staggered manner as a whole. That is, the first slits 12a or the second slits 12b are formed in the vicinity of both side edges 14 at any position in the longitudinal direction of the tape 1.

As illustrated in FIG. 1, the sub film 20 is a long member having the same width as the base film 10. The sub film 20 closes ends of the plurality of first slits 12a and ends of the plurality of second slits 12b in a thickness direction of the tape 1. The sub film 20 increases the strength of the tape 1 and prevents the slits 12 formed in the base film 10 from opening. Further, a material of the sub film 20 and a material of the base film 10 may be the same or different. Further, a thickness of the sub film 20 and a thickness of the base film 10 may be the same or different.

The heat-sealing agent 30 laminates the base film 10 and the sub film 20 together. The heat-sealing agent 30 is a heat-sensitive adhesive using a thermoplastic resin having adhesiveness. As a material of the heat-sealing agent 30, it is possible to use any material that softens at a temperature lower than a temperature at which the base film 10 and the sub film 20 melt.

Figure 3A:
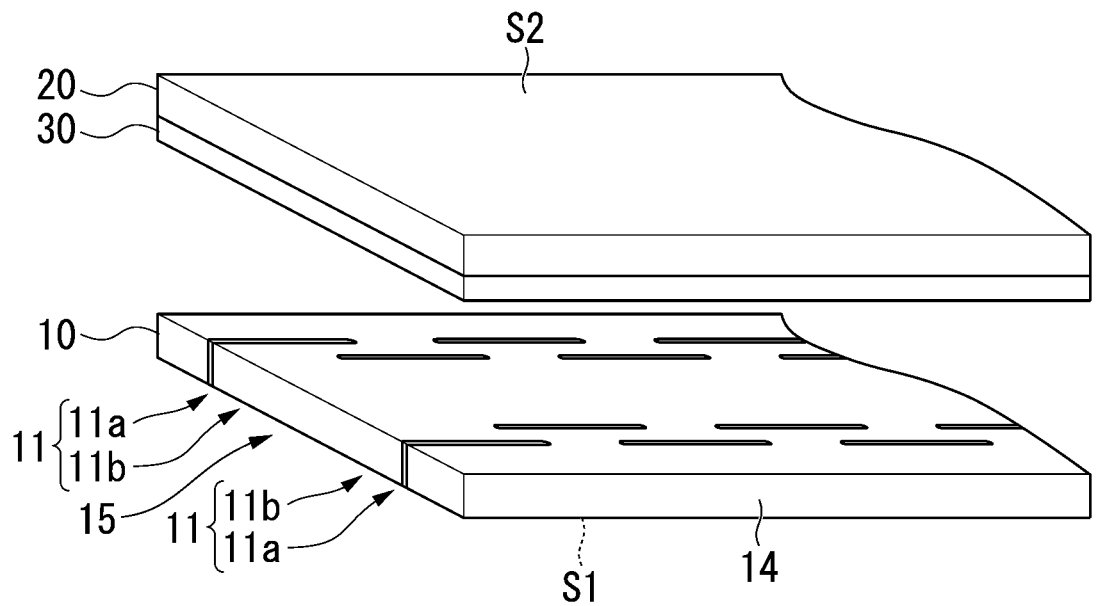
FIG. 3A is a view for explaining some tape manufacturing steps according to the first embodiment.
Figure 3B:
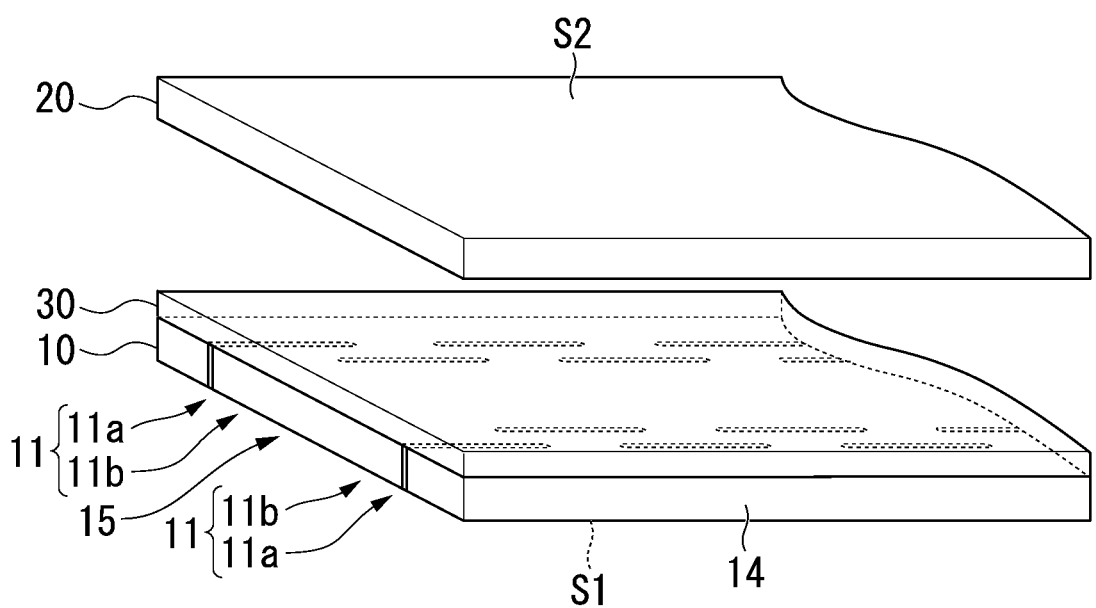
FIG. 3B is a view for explaining some of the tape manufacturing steps according to the first embodiment.

FIGS. 3A and 3B are views for explaining some tape manufacturing steps according to the first embodiment of the present disclosure. In manufacturing the tape 1, first, a step of manufacturing the base film 10 in which the strength-reducing portion 11 is formed is performed. In this step, the first and second slits 12a and 12b are intermittently formed at intervals in the longitudinal direction of the base film 10 using, for example, a cutter for surface processing. Thereby, the slit rows 11a and 11b (strength-reducing portion 11) are formed.

Next, a step of laminating the base film 10 in which the strength-reducing portion 11 is formed and the sub film 20 together is performed. Specifically, a heat treatment is performed after positioning of the base film 10 and the sub film 20 in the transverse direction is performed. By the heat treatment, the base film 10 and the sub film 20 are laminated together by the heat-sealing agent 30.

In this step, for example, it is possible to use the following two methods. In a first method, as illustrated in FIG. 3A, the base film 10 in which the strength-reducing portion 11 is formed and the sub film 20 on which the heat-sealing agent 30 is provided on one surface are laminated together. In a second method, as illustrated in FIG. 3B, the heat-sealing agent 30 is provided on the base film 10, a step of forming the strength-reducing portion 11 is performed, and then the base film 10 on which the heat-sealing agent 30 is provided and the sub film 20 are laminated together.

In the tape 1 of the present embodiment in which a tensile load is applied in the longitudinal direction, when a cut occurs in the side edge 14 of the tape 1, the cut develops in the transverse direction. In the slit rows 11a and 11b, a tear strength of the tape 1 in the longitudinal direction is relatively low compared to that of the strength-maintaining portion 15. Therefore, the cut that has reached the slit row 11a or the slit row 11b of the strength-reducing portion 11 develops in the longitudinal direction along the slit row 11a or the slit row 11b.

As described above, in the tape 1 according to the present embodiment, the strength-reducing portion 11 (slit rows 11a and 11b) extending in the longitudinal direction is formed in the vicinity of both side edges 14 of the base film 10. Thereby, even when the side edge 14 of the tape 1 is scratched, since the cut is prevented from developing in the transverse direction by the strength-reducing portion 11 (slit rows 11a and 11b), the tape 1 is not easily cut off.

Figure 4:
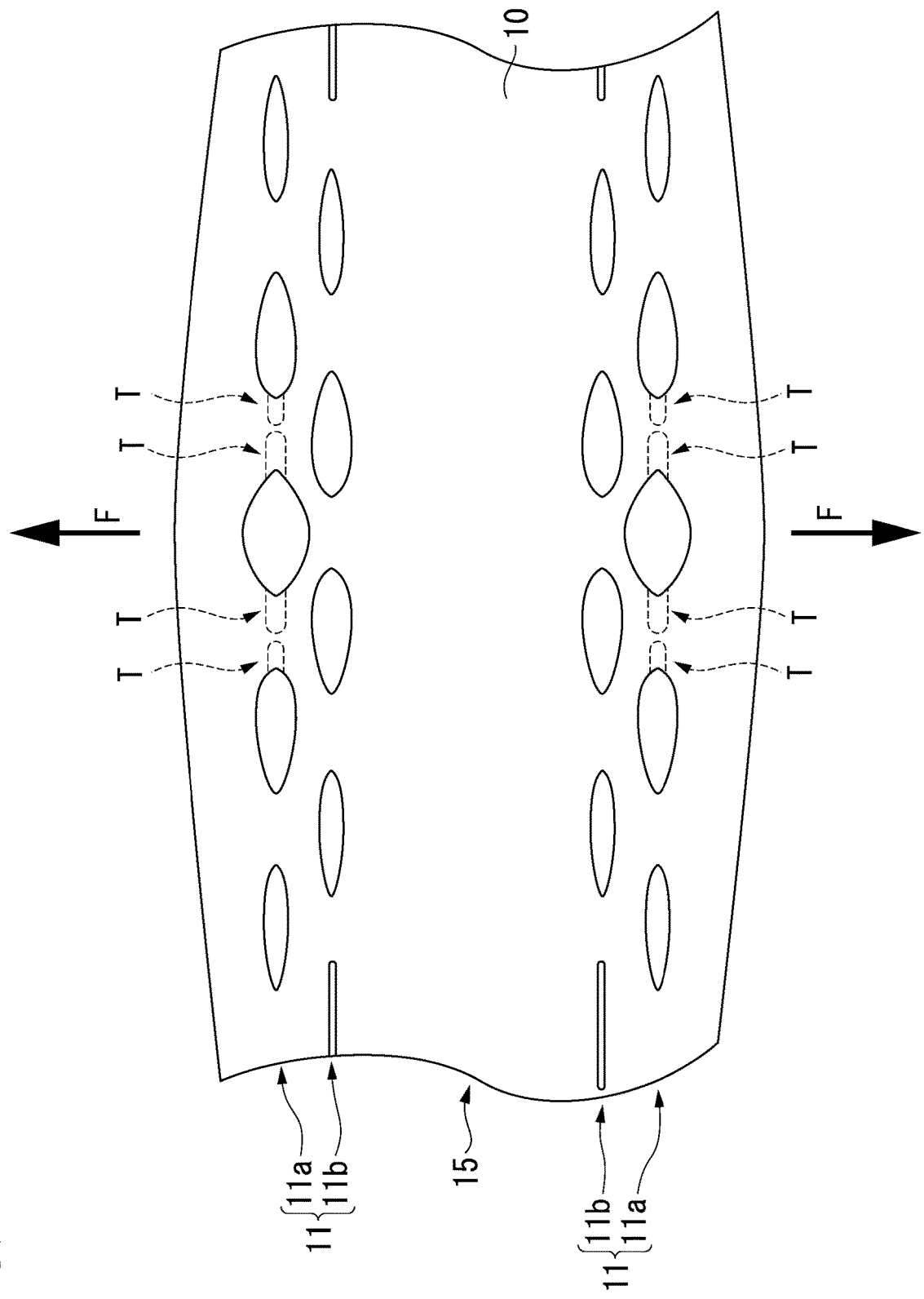
FIG. 4 is a view for explaining an operation of a sub film in the first embodiment.

Here, an operation of the sub film in the first embodiment of the present disclosure will be described with reference to FIG. 4.

In the tape 1 of the present embodiment, the sub film 20 is laminated on the base film 10 in which the strength-reducing portion 11 is formed. Therefore, it is possible to prevent the slits 12 formed in the base film 10 from opening. Thereby, as illustrated in FIG. 4, when a tensile force F acts in the transverse direction of the base film 10, it is possible to prevent a tear T (tear in the longitudinal direction along the slit rows 11a and 11b) from occurring.

Second Embodiment

Figure 5:
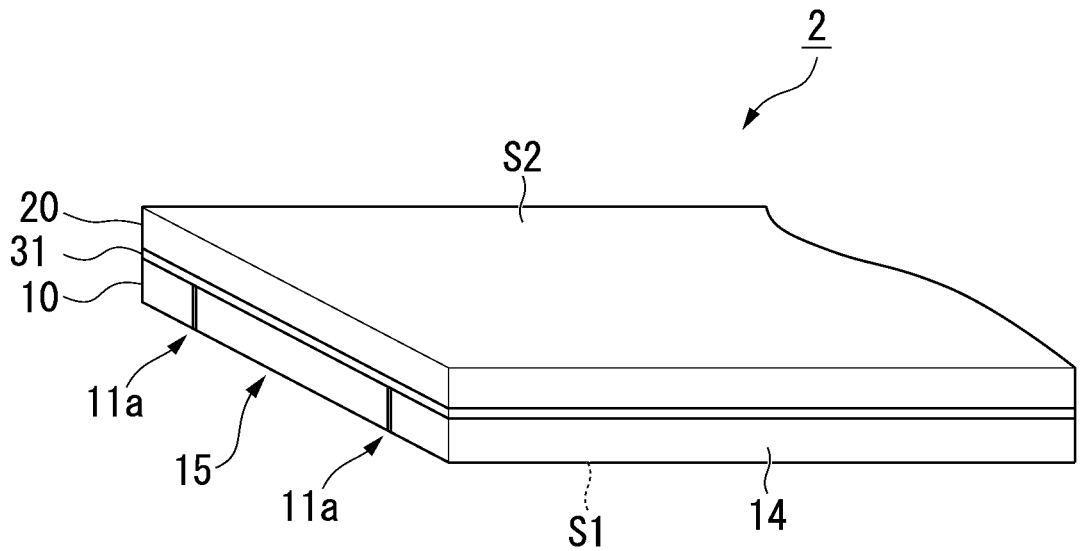
FIG. 5 is a perspective view illustrating a part of a tape according to a second embodiment.

FIG. 5 is a perspective view illustrating a part of a tape according to a second embodiment of the present disclosure. In FIG. 5, components that are the same as those illustrated in FIG. 1 will be denoted by the same reference signs. As illustrated in FIG. 5, a tape 2 of the present embodiment is a long tape including a first surface S1 and a second surface S2 on a side opposite to the first surface S1 similarly to the tape 1 of the first embodiment. A base film 10 is provided on the first surface S1. A sub film 20 is provided on the second surface S2. The tape 2 has flexibility. However, the tape 2 of the present embodiment is different from the tape 1 of the first embodiment in that the base film 10 and the sub film 20 are laminated together by an adhesive 31.

Similarly to the first embodiment, it is possible to manufacture the tape 2 having such a configuration by performing a step of manufacturing the base film 10 in which a strength-reducing portion 11 is formed, and a step of laminating the base film 10 in which the strength-reducing portion 11 is formed and the sub film 20 together. However, in the step of laminating the base film 10 and the sub film 20 together, the adhesive is applied to at least one of surfaces of the base film 10 and the sub film 20 facing each other, and then the base film 10 and the sub film 20 are laminated together.

Also in the tape 2 of the present embodiment, since the strength-reducing portion 11 (slit rows 11a and 11b) extending in a longitudinal direction is formed in the vicinity of both side edges 14 of the base film 10, the tape 2 is not easily cut off. Also, since the sub film 20 is laminated on the base film 10 in which the strength-reducing portion 11 is formed, when a tensile force F acts in a transverse direction of the base film 10, it is possible to prevent a tear T (tear in the longitudinal direction along the slit rows 11a and 11b) from occurring.

Third Embodiment

Figure 6:
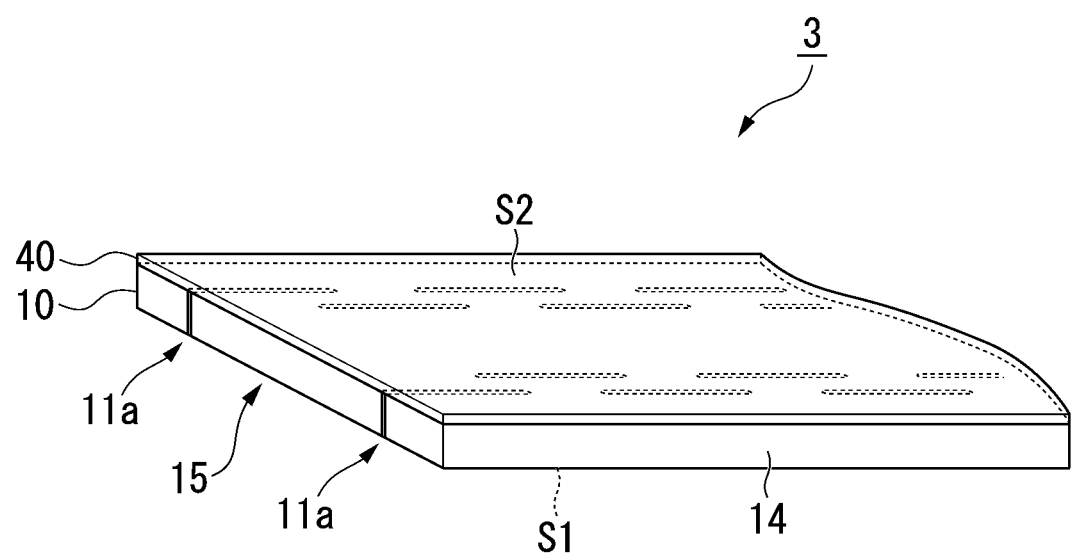
FIG. 6 is a perspective view illustrating a part of a tape according to a third embodiment.

FIG. 6 is a perspective view illustrating a part of a tape according to a third embodiment of the present disclosure. In FIG. 6, components that are the same as those illustrated in FIG. 1 will be denoted by the same reference signs. As illustrated in FIG. 6, a tape 3 of the present embodiment is a long tape including a first surface S1 and a second surface S2 on a side opposite to the first surface S1. A base film 10 is provided on the first surface S1. A resin coat 40 (an opening prevention portion, a resin) is provided on the second surface S2. The tape 3 has flexibility. That is, the tape 3 of the present embodiment has a configuration in which the resin coat 40 is provided in place of the sub film 20 and the heat-sealing agent 30 of the tape 1 illustrated in FIG. 1.

The resin coat 40 is a layer-shaped or film-shaped member formed to cover one surface of the base film 10. In other words, the resin coat 40 closes ends of a plurality of first slits 12a and ends of a plurality of second slits 12b in a thickness direction of the tape 3. Further, the resin coat 40 may be formed on the first surface S1 or may be formed on both the first surface S1 and the second surface S2. That is, the resin coat 40 may be formed on at least one of the first surface S1 and the second surface S2.

The resin coat 40 is formed by applying a resin to the base film 10. As a resin for forming the resin coat 40, for example, it is possible to use a thermosetting resin, an ultraviolet curable resin, or other resins. Similarly to the sub film 20, the resin coat 40 increases a strength of the tape 3 and prevents the slits 12 formed in the base film 10 from opening. Since the resin coat 40 is provided to prevent the slits 12 from opening, the resin coat 40 preferably has approximately the same tensile strength as the sub film 20.

Also in the tape 3 of the present embodiment, since a strength-reducing portion 11 (slit rows 11a and 11b) extending in a longitudinal direction is formed in the vicinity of both side edges 14 of the base film 10, the tape 3 is not easily cut off. Also, in the tape 3 of the present embodiment, since the resin coat 40 is formed to cover the base film 10 in which the strength-reducing portion 11 is formed, when a tensile force F acts in a transverse direction of the base film 10, it is possible to prevent a tear T (tear in the longitudinal direction along the slit rows 11a and 11b) from occurring.

Fourth Embodiment

Figure 7A:
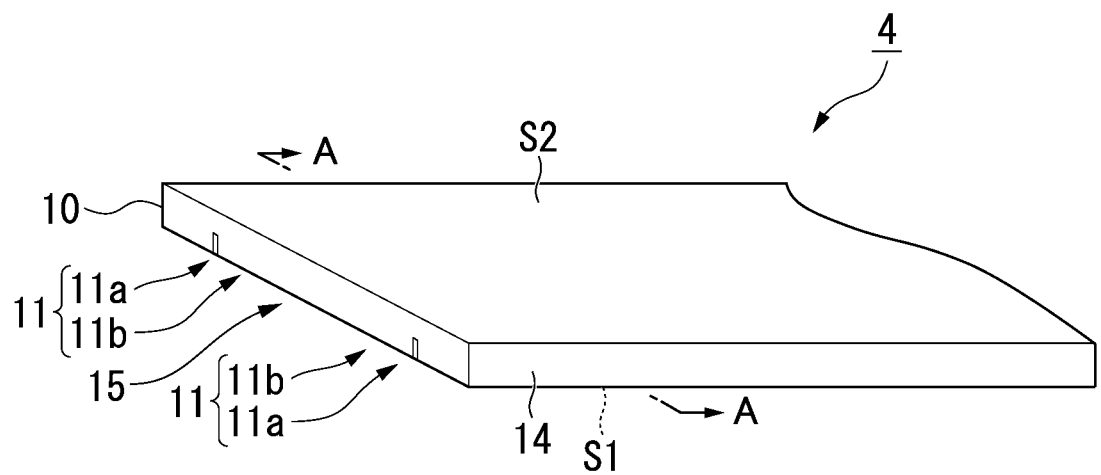
FIG. 7A is a perspective view illustrating a tape according to a fourth embodiment.
Figure 7B:
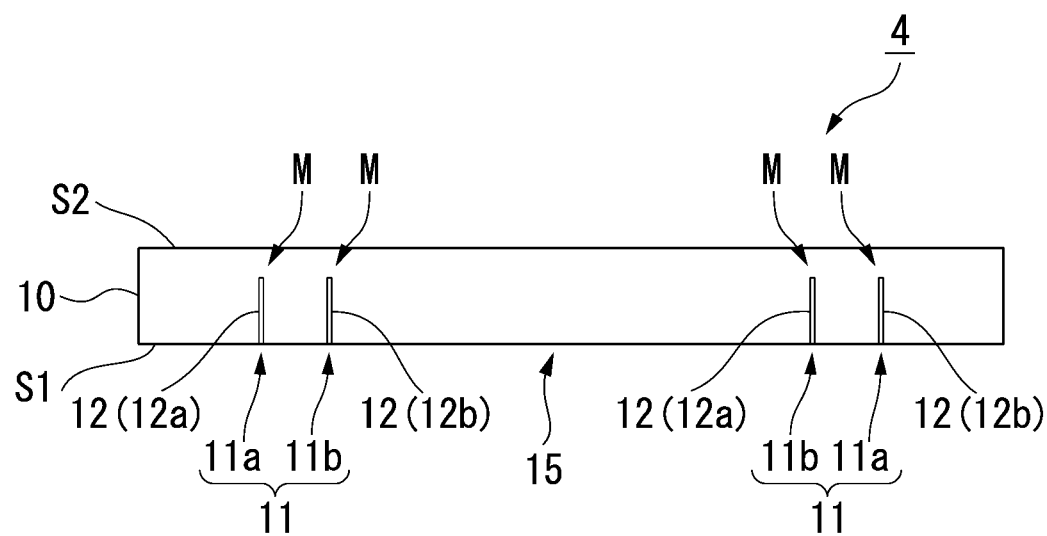
FIG. 7B is a cross-sectional view along line A-A indicated by the arrows in FIG. 7A.

FIGS. 7A and 7B are views illustrating a tape according to a fourth embodiment of the present disclosure. FIG. 7A is a perspective view illustrating a part of the tape, and FIG. 7B is a cross-sectional view along line A-A indicated by the arrows in FIG. 7A. In FIGS. 7A and 7B, components that are the same as those illustrated in FIG. 1 will be denoted by the same reference signs. As illustrated in FIG. 7A, a tape 4 of the present embodiment is a long tape including a base film 10 and having flexibility. That is, the tape 4 of the present embodiment has a configuration in which the sub film 20 and the heat-sealing agent 30 of the tape 1 illustrated in FIG. 1 are omitted.

In the tape 4 of the present embodiment, welded portions M (opening prevention portions) are provided on a second surface S2 side of the base film 10. The welded portions M are portions in which ends of slits 12 (12a and 12b) on the second surface S2 side of the base film 10 are welded. That is, the welded portions M close ends of a plurality of first slits 12a and ends of a plurality of second slits 12b in a thickness direction of the tape 4. Specifically, as illustrated in FIG. 7B, the slits 12 are open on a first surface S1 side of the base film 10, but the welded portions M are provided on the second surface S2 side. That is, in the tape 4 of the present embodiment, the slits 12 formed in the base film 10 do not penetrate from the first surface S1 to the second surface S2 of the base film 10. In other words, in the tape 4 of the present embodiment, slit rows 11a and 11b are, so to speak, erased only on the second surface S2 side of the base film 10.

The welded portions M are formed by heating the second surface S2 of the base film 10 or melting it with a solvent. The welded portions M prevent the slits 12 formed in the base film 10 from opening. Further, the first surface S1 of the base film 10 may be the welded portion M, and both the first surface S1 and the second surface S2 of the base film 10 may be the welded portion M.

That is, at least one of both surfaces of the first surface S1 and the second surface S2 of the base film 10 may be the welded portion M.

Also in the tape 4 of the present embodiment, since the strength-reducing portion 11 (slit rows 11a and 11b) extending in a longitudinal direction is formed in the vicinity of both side edges 14 of the base film 10, the tape 4 is not easily cut off. Also, in the tape 4 of the present embodiment, since one surface side of the base film 10 is the welded portion M, it is possible to prevent a tear T (tear in the longitudinal direction along the slit rows 11a and 11b) when a tensile force F acts in a transverse direction of the base film 10 from occurring.

Although the tapes according to the embodiments of the present disclosure have been described above, the present disclosure is not limited to the above-described embodiments. Shapes, combinations, or the like of the respective constituent members illustrated in the above-described embodiments are merely examples, and it is possible to make various changes on the basis of design requirements or the like without departing from the spirit of the present disclosure.

For example, the tapes 1 to 4 of the first to fourth embodiments described above may be pressure-sensitive adhesive tapes in which one of both surfaces of the first surface S1 and the second surface S2 is a pressure-sensitive adhesive surface having an adhesive portion formed by a pressure-sensitive adhesive and the other surface is a non-pressure-sensitive adhesive surface. Also, a heat sealing agent that is adhered to an object by heat may be used for the adhesive portion. It is possible to use any material that exhibits a pressure-sensitive adhesion or adhesion function for the adhesive portion.

Also, when the tapes 1 to 4 of the first to fourth embodiments described above are pressure-sensitive adhesive tapes in which one of both surfaces of the first surface S1 and the second surface S2 is a pressure-sensitive adhesive surface and the other surface is a non-pressure-sensitive adhesive surface, the adhesive portion may be formed on the entire surface of the pressure-sensitive adhesive surface. Alternatively, the adhesive portion may not be formed on the entire surface of the pressure-sensitive adhesive surface. For example, the adhesive portion may be formed only on a part of the pressure-sensitive adhesive surface.

It is also possible to use such a pressure-sensitive adhesive tape, for example, as a handle with the adhesive portion attached to an article. Also, even when the pressure-sensitive adhesive tape is used as a handle, it is possible to prevent the pressure-sensitive adhesive tape from being cut off because the strength-reducing portion 11 is formed in the pressure-sensitive adhesive tape.

Also, in the tapes 1 to 4 of the first to fourth embodiments described above, the strength-reducing portion 11 has been formed in the vicinity of both side edges 14 of the base film 10, but the strength-reducing portion 11 may be formed only in the vicinity of one side edge 14 of both side edges 14 of the base film 10. Also, the strength-reducing portion 11 may have slit rows other than the slit rows 11a and 11b.

Also, in the tapes 1 to 4 of the first to fourth embodiments described above, the strength-reducing portion 11 has been provided in the vicinity of both side edges 14 of the base film 10, but the strength-reducing portion 11 may be formed in a central portion of the base film 10 in the transverse direction. Also, the strength-reducing portion 11 may be formed parallel to the longitudinal direction, or may be formed in a direction slightly inclined from the longitudinal direction.

In addition, it is possible to appropriately replace the components in the above-described embodiments with well-known components within a range not departing from the spirit of the present disclosure, and the embodiments and modified examples described above may be appropriately combined.

REFERENCE SIGNS LIST 1 to 4 Tape
10 Base film
11 Strength-reducing portion
11a, 11b Slit row
12a, 12b Slit
13a, 13b Non-slit portion
14 Side edge
15 Strength-maintaining portion
20 Sub film (opening prevention portion)
30 Heat sealing agent
31 Adhesive
40 Resin coat
M Welded portions (opening prevention portion)
S1 First surface
S2 Second surface

The invention claimed is:

1. A tape having an elongated shape, comprising:
a first surface;
a second surface on a side opposite to the first surface;
a strength-reducing portion provided on at least one of the first surface and the second surface;
a strength-maintaining portion positioned at a portion different from that of the strength-reducing portion and having a higher strength than the strength-reducing portion; and
an opening prevention portion provided on at least one of the first surface and the second surface, wherein the strength-reducing portion includes:
a first slit row having a plurality of first slits intermittently formed at intervals in a longitudinal direction of the tape and a plurality of first non-slit portions, which are portions in which the first slits are not formed; and
a second slit row parallel to the first slit row, the second slit row that has a plurality of second slits intermittently formed at intervals in the longitudinal direction of the tape and a plurality of second non-slit portions, which are portions in which the second slits are not formed; and
the first slit row and the second slit row are disposed such that the plurality of first non-slit portions and the plurality of second non-slit portions do not overlap with each other in a transverse direction of the tape;
the opening prevention portion closes ends of the plurality of first slits and ends of the plurality of second slits in a thickness direction of the tape; and
the strength-reducing portion and the strength-maintaining portion are aligned in the transverse direction of the tape.

2. The tape according to claim 1, further comprising:
a long main base material extending in the longitudinal direction of the tape; and
a sub base material laminated on at least one surface of the long main base material, wherein the strength-reducing portion is formed in the long main base material, and the opening prevention portion is formed on the sub base material.

3. The tape according to claim 2, wherein the long main base material and the sub base material are laminated together by a heat sealing agent or an adhesive.

4. The tape according to claim 1, further comprising:
a long main base material extending in the longitudinal direction of the tape; and
a resin applied to at least one surface of the long main base material, wherein
the strength-reducing portion is formed in the long main base material, and
the opening prevention portion contains the resin.

5. The tape according to claim 1, further comprising a long main base material extending in the longitudinal direction of the tape, wherein
the strength-reducing portion is formed in the long main base material, and
the opening prevention portion includes a portion in which ends of the plurality of first slits and ends of the plurality of second slits of the tape in the thickness direction are welded.

* * * * *

UNITED STATES PATENT AND TRADEMARK OFFICE
CERTIFICATE OF CORRECTION

PATENT NO. : 12,091,593 B2
APPLICATION NO. : 17/784924
DATED : September 17, 2024
INVENTOR(S) : Sei Uemura It is certified that error appears in the above-identified patent and that said Letters Patent is hereby corrected as shown below:

On the Title Page

In Item (57) ABSTRACT   Line 4,   change "portion, a and an" to --portion, and an--

In the Specification

Column 5,   Lines 3-4,   change "the slit row 11 a or the" to --the slit row 11$a$ or the--

In the Claims

CLAIMS HEADING,   Column 8,   Line 35,   change "The invention claimed is:" to --What is claimed is:--

Signed and Sealed this
Twenty-sixth Day of November, 2024

Katherine Kelly Vidal
*Director of the United States Patent and Trademark Office*